Patented May 4, 1937

2,079,279

UNITED STATES PATENT OFFICE 2,079,279

REACTION PRODUCTS OF DIPHENYLOXIDE WITH THE DI-HALO ALIPHATIC HYDROCARBONS

Gerald H. Coleman and Bartholdt C. Hadler, Midland, Mich., assignors to The Dow Chemical Company, Midland, Mich., a corporation of Michigan No Drawing. Application July 25, 1936, Serial No. 92,692

12 Claims. (Cl. 260—150)

This invention concerns the products of the reaction of diphenyloxide with the di-halo aliphatic hydrocarbons and, particularly, those compounds having the formula—

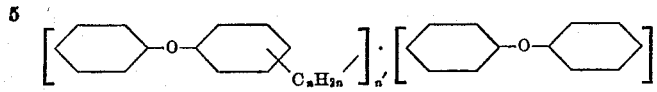

wherein $n$ is an integer from 2 to 6, inclusive, and $n'$ is an integer not greater than 2, and a method for preparing the same. We have prepared members of the above new class of compounds, determined certain of their physical properties whereby they can be readily identified, and have found them particularly useful as lubricant addition agents, dielectrics, and plasticizers.

These products are, for the most part, viscous, high boiling liquids, although some of them show a tendency to crystallize upon prolonged standing. They are substantially insoluble in water but somewhat soluble in most organic solvents.

The aforesaid products can be prepared by reacting diphenyloxide with a suitable di-halo aliphatic hydrocarbon in the presence of a catalyst such as aluminum chloride. The expression "di-halo aliphatic hydrocarbon", as herein used, refers to di-halogenated aliphatic hydrocarbons containing from 2 to 6 carbon atoms in the molecule, each of the substituting halogen groups being attached to a different carbon atom.

Although the diphenyloxide and the di-halo aliphatic hydrocarbon can be reacted together in any desired proportion, an excess of the diphenyloxide is usually employed to obtain maximum yields of the desired reaction products. The catalyst is generally employed in an amount not to exceed 0.2 mole per mole of di-halo aliphatic hydrocarbon.

In preparing these new diphenyloxide derivatives, the reaction is conveniently carried out in the liquid phase in the presence of the catalyst, slowly adding the di-halo aliphatic hydrocarbon below the surface of the liquid reaction mixture with stirring, and thereafter heating and stirring the reaction mixture until the condensation is complete, i. e. until hydrogen halide is no longer evolved. The reaction temperature is dependent upon the particular reactants involved, but is usually between about 145° and about 250° C., although somewhat higher temperatures may be employed. The reaction is usually substantially complete in from one to ten hours, depending upon the particular reactants and the proportions thereof employed. After the reaction is complete, the crude condensation mixture is washed with aqueous hydrochloric acid to decompose and remove residual catalyst, and the desired products separated therefrom, e. g. by fractional distillation in vacuo, etc.

The following examples describe in detail several adaptations of our invention, but are not to be construed as limiting the same:—

*Example 1*

A mixture of 680 grams (4.0 moles) of diphenyloxide and 13.3 grams (0.1 mole) of finely divided anhydrous aluminum chloride ($AlCl_3$) was heated to a temperature of 200° C., and, while stirring, 99 grams (1.0 mole) of ethylene dichloride was slowly introduced below the surface of the reaction mixture at a substantially uniform rate over a period of 3 hours. Thereafter the mixture was maintained, with stirring, at 200° C. for 2 hours, after which the viscous reaction product was washed with aqueous hydrochloric acid and distilled under vacuum, thereby recovering 459.0 grams of unreacted diphenyloxide, 25.7 grams of unreacted ethylene dichloride, and 224 grams of a mixed product as a light yellow oil boiling above 150° C. at 10 millimeters pressure.

This mixed product was carefully fractionated, obtaining 150.0 grams of a mixture of the isomeric mono-(phenoxyphenyl-ethyl) diphenyloxides. This product was a light lemon yellow viscous liquid having a boiling point of 245°–250° C. at 3 millimeters pressure and a specific gravity of 1.1193 at 50°/4° C., which on prolonged standing partially solidified. The solid portion of the product was fractionally crystallized from benzene and petroleum ether, yielding as a major product crystals having a melting point of 122.5°–123° C. A small amount of a white, crystalline material, melting at 103.5°–104.5° C., was also obtained. The above products, on analysis, were found to be di-(phenoxyphenyl) ethane isomers corresponding to the formula—

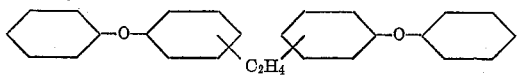

73.9 grams of a fraction boiling between 325° and 335° C. at 3 millimeters of pressure and having a specific gravity of 1.1456 at 50°/4° C. was obtained as a viscous, transparent oil, which at room temperature set to a resin-like solid. This product was a mixture of the isomeric di-(phenoxyphenyl-ethyl) diphenyloxides, probably having the formula—

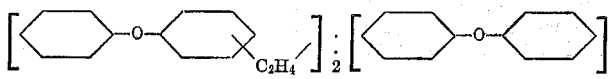

*Example 2*

680 grams (4.0 moles) of diphenyloxide and 113.0 grams (1.0 mole) of 1.2-dichloro-propane were reacted together in the presence of 13.3 grams (0.1 mole) of finely divided anhydrous aluminum chloride (AlCl₃), substantially as described in Example 1. The temperature of the reaction was maintained between 175° and 180° C. during the 2.25 hours required for the addition of the dichloro-propane to the diphenyloxide, after which the reaction mixture was washed with aqueous hydrochloric acid and distilled under vacuum, whereby 33.9 grams of unreacted dichloro-propane, 506 grams of unreacted diphenyloxide, and 205 grams of a light yellow oil, boiling above 130° C. at 5 millimeters pressure and having a specific gravity of 1.1120 at 20°/4° C., were obtained.

Among the products obtained by fractionation of the above oil was a fraction consisting of 53.3 grams of a light yellow oil boiling at 130°–135° C. at 4 millimeters pressure and having a specific gravity of 1.0541 at 20°/4° C.

82.0 grams of a second product was obtained as

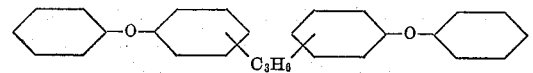

a viscous yellow liquid displaying a greenish fluorescence, boiling at 253°–256° C. at 3 millimeters pressure, and having a specific gravity of 1.1021 at 50°/4° C. This material was a mixture of the isomeric di-(phenoxylphenyl) propanes, probably having the formula—

The 69.0 grams of material remaining as a residue from the fractionation tended to decompose upon attempted distillation above 270° C. at 4 millimeters pressure. This product was a yellow-brown, rosin-like solid at room temperature, transparent in thin films, soluble in benzene, and having a softening point of 63° C. It was a mixture of the isomeric di-(phenoxy-phenyl-propyl) diphenyloxides, probably having the formula—

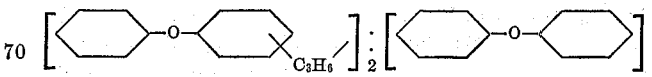

*Example 3*

127.0 grams (1 mole) of 1.2-dichlorobutane was added over a period of 1.5 hours to a molten mixture of 680.0 grams (4 moles) of diphenyloxide and 13.3 grams of anhydrous aluminum chloride, maintained at a temperature of approximately 145° C. throughout the addition. Following the addition of the dichlorobutane, the reaction mixture was heated with stirring over a period of 1.25 hours at 145° C., and the resulting crude reaction mixture washed and distilled in the usual manner, 12 grams of unreacted 1.2-dichlorobutane, 503 grams of unreacted diphenyloxide, and 219.5 grams of a mixed ether product boiling above 120° C. at 7 millimeters pressure being thereby recovered.

Fractionation of the mixed ether product yielded as a lower boiling constituent 70.2 grams of a viscous, yellowish sirup boiling at 130°–135° C. at 3 millimeters pressure and having a specific gravity of 1.061 at 20°/4° C.

By continued fractionation was obtained 90 grams of isomeric di-(phenoxyphenyl) butanes as a light yellow, viscous oil, boiling at 250°–255° C. at 3 millimeters pressure, having a specific gravity of 1.1066 at 50°/4° C., the probable formula of which is—

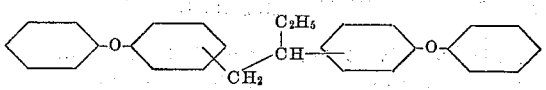

The residue from the above fractionation consisted of 58.2 grams of a viscous yellow-brown oil, liquid at elevated temperatures but brittle and rosin-like at room temperature, soluble in benzene, and boiling with decomposition above 262° C. at 3 millimeters pressure. This product is a mixture of the isomeric di-(phenoxyphenyl-butyl) diphenyloxides, having the probable formula

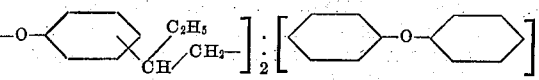

*Example 4*

680 grams (4.0 moles) of diphenyloxide and 127 grams (1.0 mole) of 1.2-dichloro-2-methyl propane were reacted together in the presence of 13.3 grams of anhydrous aluminum chloride at a temperature of approximately 145° C., substantially as described in Example 3. The preliminary distillation of the crude reaction mixture resulted in the recovery of 3.2 grams of unreacted 1.2-dichloro-3-methyl propane, 465.8 grams of unreacted diphenyloxide, and 267 grams of mixed ether products as a yellow, viscous oil boiling above 120° C. at 7 millimeters pressure and having a specific gravity of 1.0931 at 20°/4° C.

On distillation this ether mixture yielded as a preliminary fraction 106.8 grams of a light yellow liquid boiling at 127°–130° C. at 3 millimeters pressure and having a specific gravity of 1.067 at 20°/4° C.

117.5 grams of a mixture of the isomeric di-(phenoxyphenyl) butanes was isolated as a thick, viscous, yellow oil boiling at 260°–265° C. at 3 millimeters pressure, having the specific gravity

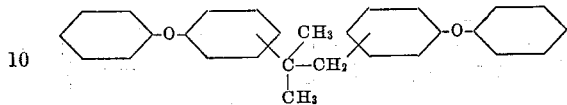

1.0925 at 50°/4° C., and probably the formula—

The residue from the fractionation consisted of 42.7 grams of a red-brown product, liquid at 100° C., setting to a rosin-like solid at room temperature, and having a softening point of 70.5° C. This product boiled with decomposition at temperatures above 320° C. at 3 millimeters pressure, was very soluble in acetone and benzene, and was a mixture of the isomeric di-(phenoxyphenyl-butyl) diphenyloxides, having the probable formula—

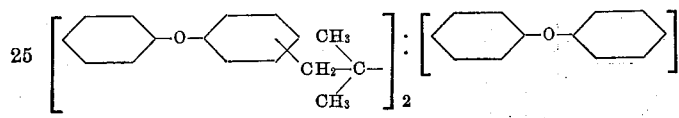

*Example 5*

127 grams (1 mole) of 1.3-dichloro-2-methyl propane was added over a period of 2 hours to a mixture of 680 grams (4 moles) of diphenyloxide and 13.3 grams of anhydrous aluminum chloride maintained at a temperature of 155°–160° C. during the addition. The resultant crude reaction mixture was washed with concentrated hydrochloric acid and yielded on preliminary distillation 29.8 grams of unreacted 1.3-dichloro-2-methyl propane, 500 grams of unreacted diphenyl-oxide, and 220 grams of a mixed ether product boiling above 120° C. at 7 millimeters pressure.

The above mixed product was fractionally distilled, whereby was isolated a low boiling fraction of 63.8 grams of a thick yellow sirup boiling at 130°–135° C. at 3 millimeters pressure and having a specific gravity of 1.0554 at 20°/4° C.

81.4 grams of a mixture of the isomeric di-(phenoxyphenyl) butanes was thereafter isolated as a thick, viscous oil, light red in color and displaying a greenish fluorescence, setting to a semi-solid at room temperature, having a boiling point of 253°–256° C. at 3 millimeters pressure and a specific gravity of 1.1175 at 50°/4° C., the probable formula being—

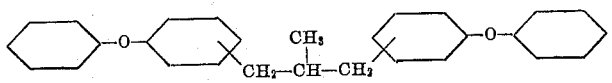

The 74.8 grams of residue from the fractionation was a brittle, red-brown, resin-like mass, liquid at elevated temperatures, boiling with decomposition above 260° C. at 3 millimeters pressure, and consisting of the isomeric di-(phenoxy-phenyl-butyl) diphenyloxides, having the probable formula—

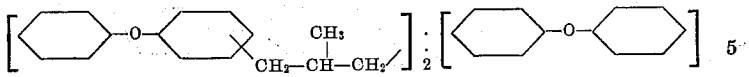

In similar manner the dibromo-aliphatic hydrocarbons may be reacted with diphenyloxide to form our new compounds. Likewise, the di-halo pentanes and hexanes may be reacted with diphenyloxide to yield analogous products; for example, diphenyloxide may be reacted with 1.2-dibromo-3-methyl butane to yield phenoxyphenyl amyl diphenyloxide compounds, and with 1.3-dichlorohexane to obtain the corresponding hexyl derivatives.

If desired, the halo-diphenyloxides, e. g. monochloro-diphenyloxide, 4.4'-dibromo-diphenyloxide, etc.; or the alkyl diphenyloxides, such as dimethyl-diphenyloxide, diethyl-diphenyloxide, etc., may be substituted for diphenyloxide in the above examples to obtain corresponding halogenated products.

The crude reaction products resulting from the above-described condensations have been found to be valuable as dielectrics, lubricant addition agents, etc., following the removal therefrom of unreacted di-halo aliphatic hydrocarbons.

Other modes of applying the principle of our invention may be employed instead of those explained, provided the materials or steps stated by any of the following claims or the equivalent of such stated materials or steps be employed.

We therefore particularly point out and distinctly claim as our invention:—

1. In a method for the preparation of compounds having the formula

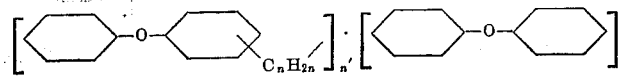

wherein $n$ is an integer from 2 to 6, inclusive, and $n'$ is an integer not greater than 2, the step which consists in reacting diphenyloxide with a di-halo aliphatic hydrocarbon in the presence of a catalytic amount of aluminum chloride.

2. In a method for the preparation of compounds having the formula

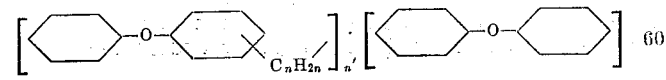

wherein $n$ is an integer from 2 to 6, inclusive, and $n'$ is an integer not greater than 2, the step which consists in reacting diphenyloxide with a di-halo aliphatic hydrocarbon containing from 2 and 6 carbon atoms, in the presence of a catalytic amount of aluminum chloride, at a temperature between 145° and 250° C.

3. In a method for the preparation of compounds having the formula

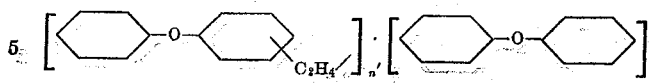

wherein $n'$ is an integer not greater than 2, the step which consists in reacting diphenyloxide with ethylene dichloride in the presence of a catalytic amount of aluminum chloride at a temperature between 145° and 250° C.

4. In a method for the preparation of compounds having the formula

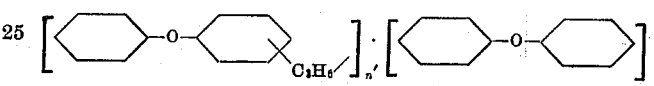

wherein $n'$ is an integer not greater than 2, the step which consists in reacting diphenyloxide with propylene dichloride in the presence of a catalytic amount of aluminum chloride, at a temperature between 145° and 250° C.

5. In a method for the preparation of compounds having the formula

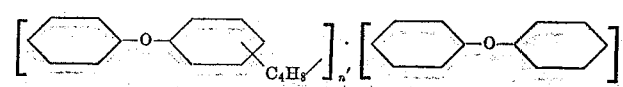

wherein $n'$ is an integer not greater than 2, the step which consists in reacting diphenyloxide with a suitable dichlorobutane in the presence of a catalytic amount of aluminum chloride, at a temperature between 145° and 250° C.

6. A compound obtained by the reaction of diphenyloxide with a di-halo aliphatic hydrocarbon in the presence of a catalytic amount of aluminum chloride at a temperature between 145° and 250° C., and probably having the formula

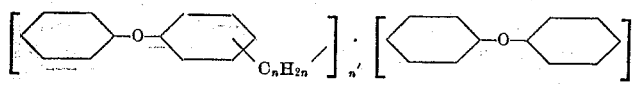

wherein $n$ is an integer from 2 to 6, inclusive, and $n'$ is an integer not greater than 2.

7. Reaction products of diphenyloxide with the di-halo aliphatic hydrocarbons having the formula

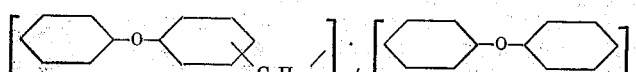

wherein $n$ is an integer from 2 to 6, inclusive, and $n'$ is an integer not greater than 2.

8. Reaction products of diphenyloxide with ethylene dichloride having the formula

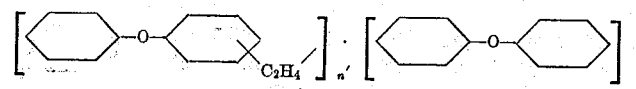

wherein $n'$ is an integer not greater than 2.

9. A compound having the formula

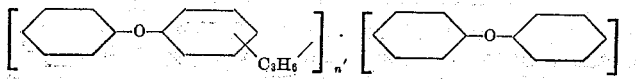

wherein $n'$ is an integer not greater than 2.

10. A compound having the formula

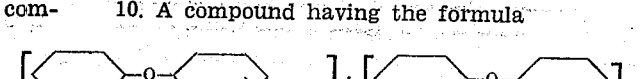

wherein $n'$ is an integer not greater than 2.

11. Di-(phenoxyphenyl) ethane.

12. Di-(phenoxyphenyl) propane.

GERALD H. COLEMAN.
BARTHOLDT C. HADLER.